Oct. 9, 1962 J. M. KRUSE 3,057,716
TREATMENT OF ORE
Filed Feb. 9, 1959
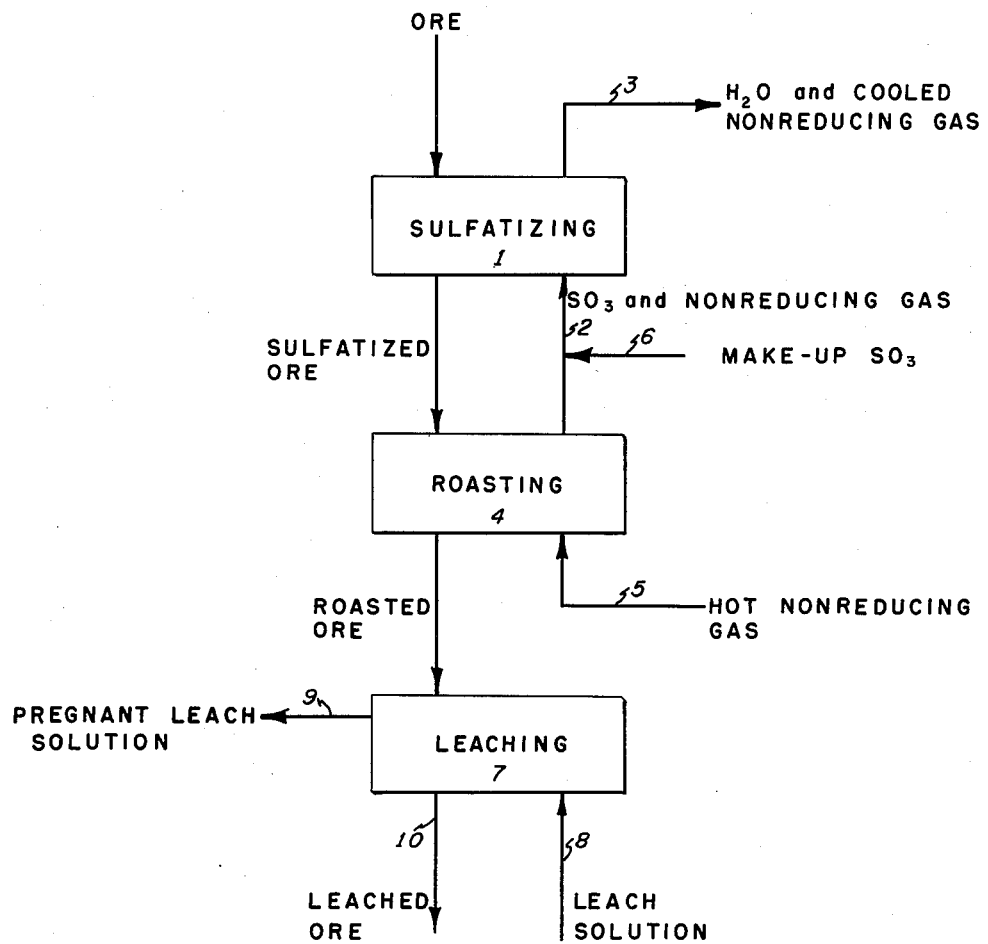
INVENTOR.
JURGEN M. KRUSE
BY

United States Patent Office 3,057,716
Patented Oct. 9, 1962

3,057,716
TREATMENT OF ORE
Jurgen M. Kruse, Pitman, N.J., assignor to E. I. du Pont de Nemours and Company, Wilmington, Del., a corporation of Delaware
Filed Feb. 9, 1959, Ser. No. 791,901
2 Claims. (Cl. 75—63)

The present invention relates to a process for the separation of nonferrous metal values from iron values. More particularly, the present invention relates to a process for the separation of nickel and cobalt values from Mayari-type lateritic iron ore containing small amounts of nickel and cobalt to produce an iron-containing residue for blast furnace feed and to produce a solution containing the nickel and cobalt values in a form in which they are easily recoverable.

A typical Mayari-type lateritic iron ore has the following analysis by weight (dry basis):

| | Percent |
|---|---|
| Fe | 48.7 |
| Ni | 1.02 |
| Co | 0.14 |
| Cr | 1.9 |
| $Al_2O_3$ | 7.1 |
| $SiO_2$ | 3.1 |
| Mn | 0.83 | and small amounts of substances such as magnesia. Such ore is not suitable for use as blast furnace feed because the nickel and cobalt contents are too high. However, Mayari-type lateritic iron ores are potentially important as sources of iron, nickel, and cobalt. Consequently a process is needed for the extraction of nickel and cobalt values from the ore, which process will provide the nickel and cobalt values in a form in which they are readily recoverable by known methods and which will provide a residue containing substantially all of the iron originally present in the ore but very little nickel and cobalt.

Accordingly, an object of this invention is to provide a process for the extraction of nickel and cobalt from Mayari-type lateritic iron ore containing small amounts if nickel and cobalt and a substantial amount of iron to obtain an iron-containing residue for blast furnace feed and to obtain the nickel and cobalt values in a readily recoverable form. Another object is to provide a process for the extraction of nickel and cobalt values from Mayari-type lateritic iron ore in an economical manner. A further object is to provide a sulfatizing process wherein sulfur trioxide is used in the sulfatizing of the ore and is fed directly from a subsequent roasting step to the sulfatization step. Other objects and advantages will become apparent as the invention is more fully described.

The foregoing objects are achieved when a Mayari-type lateritic iron ore containing nickel and cobalt values is treated with sulfur trioxide gas to convert the metals in the ore to their sulfates, said sulfur trioxide gas being obtained in major part from a roasting step wherein ferric sulfate is decomposed to ferric oxide with the evolution of sulfur trioxide and in minor part from make-up sulfur trioxide gas; the sulfatized material is roasted in a nonreducing atmosphere at a temperature such that the ferric sulfate present is decomposed to insoluble ferric oxide whereas the nickel and cobalt sulfates remain unchanged; the roasted material is leached; and the pregnant leach solution containing the nickel and cobalt sulfates is separated from the insoluble iron-containing residue.

To more adequately described the present invention, reference is now made to the accompanying drawing which is a schematic flow sheet illustrating the present process. The flow sheet is illustrative only and is not intended to limit the invention in any way. Referring now specifically to the drawing, ore is fed into a surfatizing zone generally designated by numeral 1. Sulfur trioxide gas in admixture with a nonreducing gas is admitted via line 2 to sulfatizing zone 1 where the sulfur trioxide comes in contact with the ore to form sulfates of the metals contained therein. Water and cooled nonreducing gas leave sulfatizing zone 1 at 3. The sulfatized ore passes to a roasting zone generally designated by numeral 4 wherein the ore is heated at a temperature between 500° C. and 620° C. for one-twelfth to three hours to decompose the ferric sulfate to ferric oxide and sulfur trioxide. Hot nonreducing gas is admitted to roasting zone 4 through line 5 to maintain the desired roasting temperature and to assist in the removal of the sulfur trioxide evolved. The nonreducing gas and entrained sulfur trioxide pass from roasting zone 4 to sulfatizing zone 1 through line 2. Make-up sulfur trioxide is added as needed to sulfatizing zone 1 through line 6. The roasted ore is transferred from roasting zone 4 to a leaching zone generally designated by numeral 7. Water for leaching is introduced into zone 7 through line 8. The pregnant leach liquor, an aqueous solution containing dissolved nickel and cobalt sulfates is withdrawn from leach zone 7 through line 9. The pregnant leach liquor may then be treated to recover the nickel and cobalt values contained therein. The insoluble material remaining in leach zone 7 after separation of the pregnant leach liquor is removed from leach zone 7 through line 10 and may be dried and briquetted for use as blast furnace feed.

As can be seen from the drawing, sulfur trioxide recycles continuously between sulfatizing zone 1 and roasting zone 4; no separate recovery step or recovery apparatus is necessary for the sulfur trioxide. This feature of continuous internal recycle of sulfur trioxide makes for simplicity and great economy of operation in the present process.

If desired, the ore may be subjected, before the sulfatization, to a preliminary treatment such as screening, grinding, or magnetic or hydraulic classification. However, such preliminary treatment does not constitute a part of the present invention.

Sulfatization of the ore is accomplished by contacting the ore with sulfur trioxide gas. The ore may be dry or wetted with water. The sulfur trioxide may be passed over an agitated bed of ore or may be passed upwardly through a bed of ore—any method is suitable that allows the sulfur trioxide to come into contact with substantially all of the ore. The factors governing the amount of water added to the ore when the ore is to be sulfatized in the wet state are primarily practical considerations. As previously stated, the ore may be sulfatized dry; hence there is no minimum limit to the amount of water which is present. All of the water added to the ore for the sulfatization step must eventually be driven off in the subsequent roast. Therefore, the greater the amount of water added prior to sulfatization, the greater the expenditure of heat necessary in the subsequent roasting to dry the ore. On the other hand, the water present provides a means of temperature control during sulfatization. Thus the specific quantity of water added is a function of the design of the equipment used.

Sulfatization of the ore takes place at from room temperature up to the temperature at which the metal sulfates formed decompose. To obtain a reasonable rate of sulfatization and to avoid decomposition of any of the sulfates formed, it is desirable to effect the sulfatization at temperatures between 100° C. and 500° C.

The sulfur trioxide gas used in the sulfatization consists of sulfur trioxide obtained in major part from the decomposition of ferric sulfate in the roasting zone and in minor part from makeup sulfur trioxide added as to the sulfatizing zone. The sulfur trioxide taken up in the sulfatization to form ferric sulfate is recovered during the subsequent roasting. The sulfur trioxide used to sulfate the aluminum in the ore may also be recovered in the subsequent roasting if desired, thus permitting recovery of up to 95% of the sulfur trioxide used for sulfatization of the ore. Only enough make-up sulfur trioxide need be added to replace the sulfur trioxide held by the metal sulfates which remain undecomposed at the end of the roast. Preferably, the sulfur trioxide used to treat the ore is admixed with a diluent gas. As the diluent gas, any nonreducing gas may be used, for example, oxygen, air, nitrogen, carbon dioxide, burner gas, etc.

When the metal values in the ore have been converted to their sulfates, the contact of sulfur trioxide with the ore is stopped and the sulfatized material is roasted at 500–620° C. in a nonreducing atmosphere to convert ferric sulfate to insoluble ferric oxide. If the temperature of the ore falls below about 500° C., the rate of decomposition of ferric sulfate to ferric oxide proceeds too slowly to be practical. If the temperature of the ore rises above 620° C. during the roasting, the amount of nickel extracted in the subsequent leaching drops. Preferred roasting temperatures are between 540° C. and 600° C.

Ferric sulfate is decomposed by heat to ferric oxide and sulfur trioxide as shown by the equation:

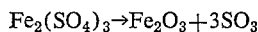

$$Fe_2(SO_4)_3 \rightarrow Fe_2O_3 + 3SO_3$$

Accordingly, this reaction can be driven to completion by removal of sulfur trioxide from the reaction zone. This is accomplished by passing a stream of gas through the roasting zone to sweep out the sulfur trioxide evolved. The gas must be a nonreducing gas in order to maintain a nonreducing atmosphere in the roasting zone as mentioned earlier. Preferably, the nonreducing gas employed is the same as the diluent gas admixed with sulfur trioxide in the sulfatization. Then the entire gas stream, sulfur trioxide plus non-reducing gas, is cycled directly from the roasting zone to the sulfatizing zone. It is usually necessary to supply heat to the roasting zone in order to maintain the temperature of the ore at the desired roasting temperature. Heat may be supplied to the exterior of the roasting furnace or, preferably, the nonreducing gas passed through the roasting zone to entrain the sulfur trioxide evolved may contain the necessary heat. The roasting time should be less than 3 hours. If the roasting time exceeds 3 hours, the amount of nickel extracted in the subsequent leaching drops. The minimum roasting time is limited only by the rate at which the sulfur trioxide can be removed. While this is a matter of equipment design, a minimum of about 5 minutes will be required.

The roasting material is removed from the roasting zone and leached to remove the soluble metal sulfates from the insoluble material. The amount of leach solution employed with respect to the amount of ore being leached is not critical as long as enough liquid is present that it does not become saturated with soluble material. Since the amount of soluble material present constitutes a very small proportion of the ore, an amount of leach solution is sufficient which will permit ready separation of the pregnant leach solution from the insoluble residue by filtration or decantation. I prefer to add one part by weight of ore to 3–6 parts of leach solution to facilitate separation. If the pH of the pregnant solution prior to its separation from the solid material is below 2.5, an appreciable quantity of ferric oxide is extracted in the leach solution. When the pH of the leach solution is higher than 4.5, the amounts of nickel and cobalt extracted drop. The preferred pH range is from 2.7 to 3.5. By this leach operation it is possible to extract around 95% by weight of the nickel and cobalt initially present in the ore. The pregnant leach solution obtained on separation contains the soluble metal sulfates from which nickel and cobalt values may be recovered by methods well known to the art. Such recovery methods do not form a part of the present invention.

The insoluble residue, which contains substantially all of the iron initially present in the ore but very little of the nickel and cobalt may be dried and briquetted for use as blast furnace feed. If necessary, residual sulfate may be washed from the ore after the nickel and cobalt values have been removed.

The following examples serve to further clarify the present process and are not intended to limit the invention. Percentages and parts, where given, are by weight.

*Example 1*

Twenty parts of slimed and dried Mayari-type lateritic iron ore containing 53.0% of iron, 1.07% of nickel, and 0.14% of cobalt was moistened with 10 parts of water. Sulfur trioxide in admixture with air was passed upwardly through a heated bed of the moistened ore for 2½ hours during which time the temperature of the ore reached 474° C. The off-gas was essentially free of sulfur trioxide. At the end of the 2½ hours the flow of sulfur trioxide was stopped and the ore was roasted at 590° C. for 1 hour. During the roast, air was passed through the roasting zone to entrain the sulfur trioxide evolved. The roasted ore was leached by drowning it in 100 parts of leach solution, agitating the mixture for about two hours, adjusting the pH of the solution to 3 by the addition of ammonium hydroxide, and filtering off the pregnant leach liquor. The solids were then releached with 40 parts of leach solution. The leached residue was washed with dilute aqueous ammonium hydroxide and dried. The pregnant leach solution contained over 97% of the nickel and cobalt originally present in the ore, and the dried residue, which consisted of 15.8 parts of solids, contained 58% iron, 0.014% nickel and less than 0.002% cobalt.

*Example 2*

A stream of sulfur trioxide in admixture with air was passed upwardly through a bed of 14 parts of slimed dry Mayari-type lateritic iron ore containing 53.0% iron, 1.07% nickel and 0.14% cobalt. The sulfatization was continued for 75 minutes during which time the ore reached a temperature of 446° C. The off-gas from this step was essentially free of any sulfur trioxide. The sulfatized ore was roasted for 90 minutes at a maximum of 600° C. while air was passed through the ore bed to entrain the sulfur trioxide evolved. The roasted ore was leached several times with 70 parts of leach solution each time. The pH of the pregnant leach solution was adjusted to 3.2 before it was filtered from the insoluble material. The leached residue was washed with dilute aqueous ammonium hydroxide and dried to give a residue containing 0.085% nickel, and 0.01% cobalt. The combined pregnant leach solutions contained 92% of the nickel originally present in the ore.

If the roasting temperature exceeds 620° C. or the roasting time is longer than 3 hours, the amounts of nickel and cobalt extracted from the ore into the leach solution are markedly reduced. The foregoing are illustrated by Examples 3 and 4, respectively.

*Example 3*

Twenty parts of slimed and dried Mayari-type lateritic iron ore containing 53% iron, 1.07% nickel, and 0.15% cobalt was wetted with 10 parts of water. Sulfur trioxide in admixture with air was passed upwardly through the moistened ore for 1 hour during which time the temperature of the ore reached 400° C. The flow of sulfur trioxide was then stopped and the ore was roasted for 3 hours at 680° C. while air was passed through the roasting zone to entrain the sulfur trioxide evolved. The roasted ore was leached with 80 parts of leach solution, the pH of the pregnant leach solution being adjusted to 3 before it was filtered from the insoluble material. The residue was washed with dilute aqueous ammonium hydroxide and dried to give a residue containing 61% iron and 0.45% nickel. The pregnant leach liquor contained only 58% of the nickel initially present in the ore.

*Example 4*

Twenty parts of slimed and dried Mayari-type lateritic iron ore containing 53% iron, 1.07% nickel, and 0.15% cobalt was wetted with 10 parts of water. A stream of sulfur trioxide and air was passed upwardly through the moistened ore for 1 hour during which time the temperature of the ore reached 400° C. The flow of sulfur trioxide was then stopped and the ore was roasted for 5 hours at 600° C. while air was passed through the roasting zone to entrain the sulfur trioxide evolved. The roasted ore was leached with 80 parts of leach solution, the pH of the pregnant leach solution being adjusted to 3 before filtration from the solid material. The residue left after the pregnant leach solution was filtered off was washed with dilute aqueous ammonium hydroxide and dried to give solids containing 58% iron, 0.184% nickel, and 0.02% cobalt. The pregnant leach solution contained only 83% of the nickel initially present in the ore.

While the process illustrated in the examples was carried out batchwise, large-scale operation would be performed in a continuous manner. The present process is particularly adaptable to continuous operation because of the internal recycle of the sulfatizing gas and the unidirectional flow of both the gas stream and the process ore.

The invention has been described in detail in the foregoing. The process is subject to many modifications and variations readily apparent to those versed in the art without departure from the scope of the invention. Accordingly, I intend to be limited only by the following claims.

I claim:
1. A process for the extraction of nickel and cobalt values from Mayari-type lateritic iron ore containing up to about 1.07% by weight nickel, up to about 0.15% by weight cobalt and up to about 53% by weight iron by the steps of (1) sulfatizing, (2) roasting, (3) leaching, and (4) separating, which comprises
    (1) in the sulfatizing step, contacting the ore with sulfur trioxide-containing gas consisting in part of gas from said roasting step and in part of make-up sulfur trioxide gas, to form the sulfates of iron, nickel, cobalt, chromium, manganese, aluminum and silicon,
    (2) in the roasting step, heating said sulfatized mass at a temperature from about 500° C. to about 620° C. for from $1/12$ to 3 hours to convert the ferric sulfate to insoluble ferric oxide while continuously feeding the sulfur trioxide evolved to said sulfatizing step,
    (3) in the leaching step, leaching the roasted product with an aqueous leach solution, the pH of said leach solution being so adjusted that the pregnant leach solution leaving the leaching step has a pH of from 2.5 to 4.5, and
    (4) in the separating step, separating the insoluble ferric oxide from the substances in solution.
2. The process of claim 1 wherein the temperature is maintained between 100° C. and 500° C. during the contact of sulfur trioxide with said ore.

References Cited in the file of this patent
UNITED STATES PATENTS

| | | |
|---|---|---|
| 1,212,334 | Eustis | Jan. 16, 1917 |
| 1,590,525 | Kichline | June 29, 1926 |
| 1,674,491 | Wetherbee | June 19, 1928 |
| 1,964,747 | Sweet et al. | July 3, 1934 |
| 2,026,775 | Debuch | Jan. 7, 1936 |